United States Patent [19]
Spall

[11] Patent Number: 6,040,803
[45] Date of Patent: Mar. 21, 2000

[54] DUAL BAND DIVERSITY ANTENNA HAVING PARASITIC RADIATING ELEMENT

[75] Inventor: John M. Spall, Raleigh, N.C.

[73] Assignee: Ericsson Inc., Research Triangle Park, N.C.

[21] Appl. No.: 09/026,456

[22] Filed: Feb. 19, 1998

[51] Int. Cl.[7] .................................................. H01Q 1/38

[52] U.S. Cl. .................... 343/700 MS; 343/702; 343/895

[58] Field of Search ........................... 343/702, 700 MS, 343/895

[56] References Cited

U.S. PATENT DOCUMENTS

| | | | |
|---|---|---|---|
| 4,401,988 | 8/1983 | Kaloi | 343/700 MS |
| 4,619,001 | 10/1986 | Kane | 455/192 |
| 4,700,194 | 10/1987 | Ogawa et al. | 343/700 MS |
| 4,860,020 | 8/1989 | Wong et al. | 343/828 |
| 5,365,246 | 11/1994 | Rasinger et al. | 343/702 |
| 5,559,524 | 9/1996 | Takei et al. | 343/895 |
| 5,898,404 | 4/1999 | Jou | 343/700 MS |

FOREIGN PATENT DOCUMENTS

| | | |
|---|---|---|
| 04035207 | 2/1992 | Japan . |
| 2 260 226 | 4/1993 | United Kingdom . |
| WO 93/12559 | 6/1993 | WIPO . |
| WO 96/27219 | 9/1996 | WIPO . |
| WO 97/49141 | 12/1997 | WIPO . |
| WO 98/49742 | 11/1998 | WIPO . |

OTHER PUBLICATIONS

Wong et al., Modified planar inverted F antenna, Electronics Letters, vol. 34, No. 1 pp. 7–8 (Aug. 1, 1998).

PCT International Search Report, PCT International Application No. PCT/US99/02470 (May 28, 1999).

Primary Examiner—Don Wong
Assistant Examiner—Hoang Nguyen
Attorney, Agent, or Firm—Myers Bigel Sibley & Sajovec, P.A.

[57] ABSTRACT

A planar diversity antenna for communications devices, such as radiotelephones, has two radiating elements secured to opposite sides of a dielectric substrate. One radiating element is parasitically coupled to a fed radiating element to resonate at respective adjacent frequency bands. Each radiating element has a meandering electrically conductive path. The planar diversity antenna is maintained in spaced apart, generally parallel relationship with a ground plane within a radiotelephone.

16 Claims, 2 Drawing Sheets

DUAL BAND DIVERSITY ANTENNA HAVING PARASITIC RADIATING ELEMENT

FIELD OF THE INVENTION

The present invention relates generally to antennas, and more particularly to diversity antennas used within communication devices.

BACKGROUND OF THE INVENTION

Antennas for personal communication devices, such as radiotelephones, may not function adequately when in close proximity to a user during operation, or when a user is moving during operation of a device. Close proximity to objects or movement of a user during operation of a radiotelephone may result in degraded signal quality or fluctuations in signal strength, known as multipath fading. Diversity antennas have been designed to work in conjunction with a radiotelephone's primary antenna to improve signal reception.

Many of the popular hand-held radiotelephones are undergoing miniaturization. Indeed, many of the contemporary models are only 11–12 centimeters in length. Unfortunately, as radiotelephones decrease in size, the amount of internal space therewithin may be reduced correspondingly. A reduced amount of internal space may make it difficult for existing types of diversity antennas to achieve the bandwidth and gain requirements necessary for radiotelephone operation because their size may be correspondingly reduced.

Furthermore, it may be desirable for a diversity antenna to be able to resonate over multiple frequency bands. For example, the Japanese Personal Digital Cellular (PDC) system utilizes two "receive" frequency bands and two "transmit" frequency bands. Accordingly, a diversity antenna within a radiotelephone used in the Japanese PDC system should preferably be able to resonate in each of the two receive frequency bands. Unfortunately, the ability to provide diversity antennas with adequate gain over multiple frequency bands may be presently limited because of size limitations imposed by radiotelephone miniaturization.

SUMMARY OF THE INVENTION

It is, therefore, an object of the present invention to provide diversity antennas that can resonate over multiple frequency bands with sufficient gain for use within personal communication devices such as radiotelephones.

It is also an object of the present invention to provide reduced size diversity antennas that can resonate over multiple frequency bands with sufficient gain and that can be installed within the small internal space of miniature radiotelephones.

These and other objects of the present invention are provided by a planar diversity antenna for communications devices, such as radiotelephones, having two radiating elements secured to opposite sides of a dielectric substrate and parasitically coupled to jointly resonate at two adjacent frequency bands. One radiating element, referred to as the "fed" radiating element, has a meandering electrically conductive path with an RF feed point and a ground point thereon. A second radiating element, referred to as the "parasitic" radiating element, has a meandering electrically conductive path thereon. The parasitic radiating element is maintained in a spaced-apart, generally parallel relationship with both the "fed" radiating element and a ground plane.

When a planar diversity antenna according to the present invention is used within a radiotelephone, a shield can overlying the RF circuitry may serve as a ground plane. The planar antenna element is secured within the housing of a radiotelephone such that the parasitic radiating element is in spaced apart parallel relationship with an outer planar surface of the shield can. An aperture in the shield can outer surface allows a hot feed element to extend from the RF circuitry through the shield can aperture and electrically connect with the feed point on the fed radiating element conductive path. A ground feed element electrically connects the ground post on the fed radiating element conductive path with the grounded shield can.

The fed and parasitic radiating elements may have meandering electrically conductive paths with different electrical and physical lengths. Accordingly, the fed and parasitic radiating elements jointly radiate in dual-band resonances. Exemplary adjacent frequency bands include from between 0.810 and 0.828 GHz and between 0.870 and 0.885 GHz.

Diversity antennas according to the present invention may be advantageous because their configuration can allow them to conform to the small space constraints of current radiotelephones and other communication devices while providing adequate gain and bandwidth characteristics. The dual band functionality of diversity antennas incorporating aspects of the present invention may be particularly advantageous in countries, such as Japan, which utilize multiple frequency bands for transmitting and receiving radiotelephone communications. The present invention may be suitable as a diversity antenna for a dual band radiotelephone.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As is known to those skilled in the art, an antenna is a device for transmitting and/or receiving electrical signals. A transmitting antenna typically includes a feed assembly that induces or illuminates an aperture or reflecting surface to radiate an electromagnetic field. A receiving antenna typically includes an aperture or surface focusing an incident radiation field to a collecting feed, producing an electronic signal proportional to the incident radiation. The amount of power radiated from or received by an antenna depends on its aperture area and is described in terms of gain. Radiation patterns for antennas are often plotted using polar coordinates. Voltage Standing Wave Ratio (VSWR) relates to the impedance match of an antenna feed point with the feed line or transmission line. To radiate RF energy with minimum loss, or to pass along received RF energy to the receiver with minimum loss, the impedance of the antenna should be matched to the impedance of the transmission line or feeder.

Radiotelephones typically employ a primary antenna which is electrically connected to a transceiver operably associated with a signal processing circuit positioned on an internally disposed printed circuit board. In order to maximize power transfer between the antenna and the transceiver, the transceiver and the antenna are preferably interconnected such that the respective impedances are substantially "matched," i.e., electrically tuned to filter out or compensate for undesired antenna impedance components to provide a 50 Ohm (or desired) impedance value at the circuit feed.

As is well known to those skilled in the art, a diversity antenna may be utilized in conjunction with a primary antenna within a radiotelephone to prevent calls from being dropped due to fluctuations in signal strength. Signal strength may vary as a result of a user moving between cells in a cellular telephone network, a user walking between buildings, interference from stationary objects, and the like. Diversity antennas are designed to pick up signals that the main antenna is unable to pick up through spatial, pattern, and bandwidth or gain diversity. Diversity antennas may also be utilized to offset Rayleigh fading, which may include sudden deep fades or losses of signal strength due to multipath phase cancellation.

Figure 1:
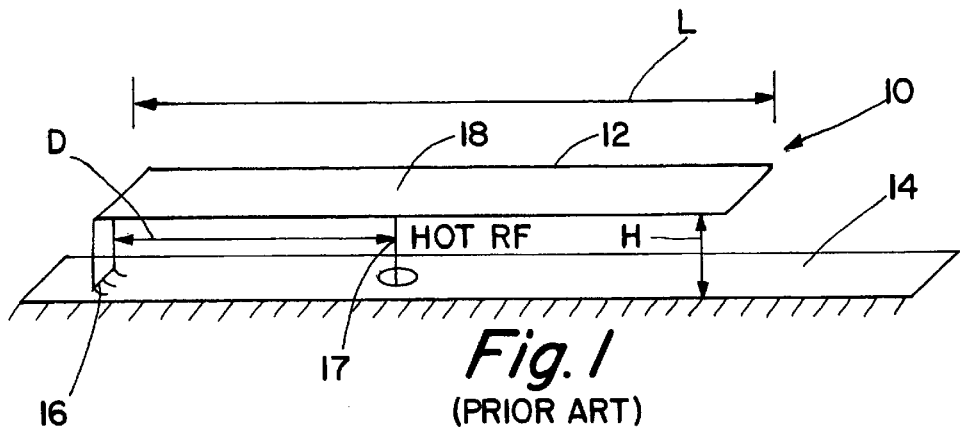
FIG. 1 illustrates a planar inverted F antenna used within radiotelephones.

A type of diversity antenna well known in the art is the Planar Inverted F Antenna (PIFA) and is illustrated in FIG. 1. The illustrated PIFA 10 includes a radiating element 12 maintained in spaced apart relationship with a ground plane 14. The radiating element is also grounded to the ground plane 14 as indicated by 16. A hot RF connection 17 extends from underlying circuitry (not shown) through the ground plane 14 to the radiating element 12 at 18. A PIFA is tuned to desired frequencies by adjusting the following parameters which can affect gain and bandwidth: varying the length L of the radiating element 12; varying the gap H between the radiating element 12 and the ground plane 14; and varying the distance D between the ground and hot RF connections. Ground plane size may also be an important tuning parameter. Other parameters known to those skilled in the art may be adjusted to tune the PIFA, and will not be discussed further.

Figure 2A:
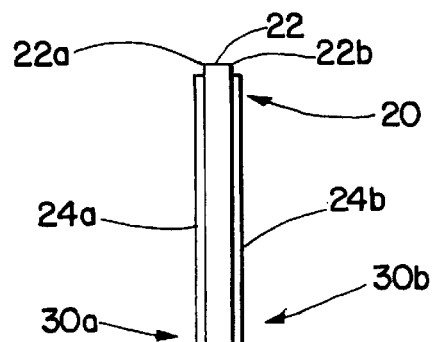
FIGS. 2A–2C illustrate a dual band diversity antenna having a fed radiating element and a parasitic radiating element, according to the present invention.
Figures 2B, 2C:
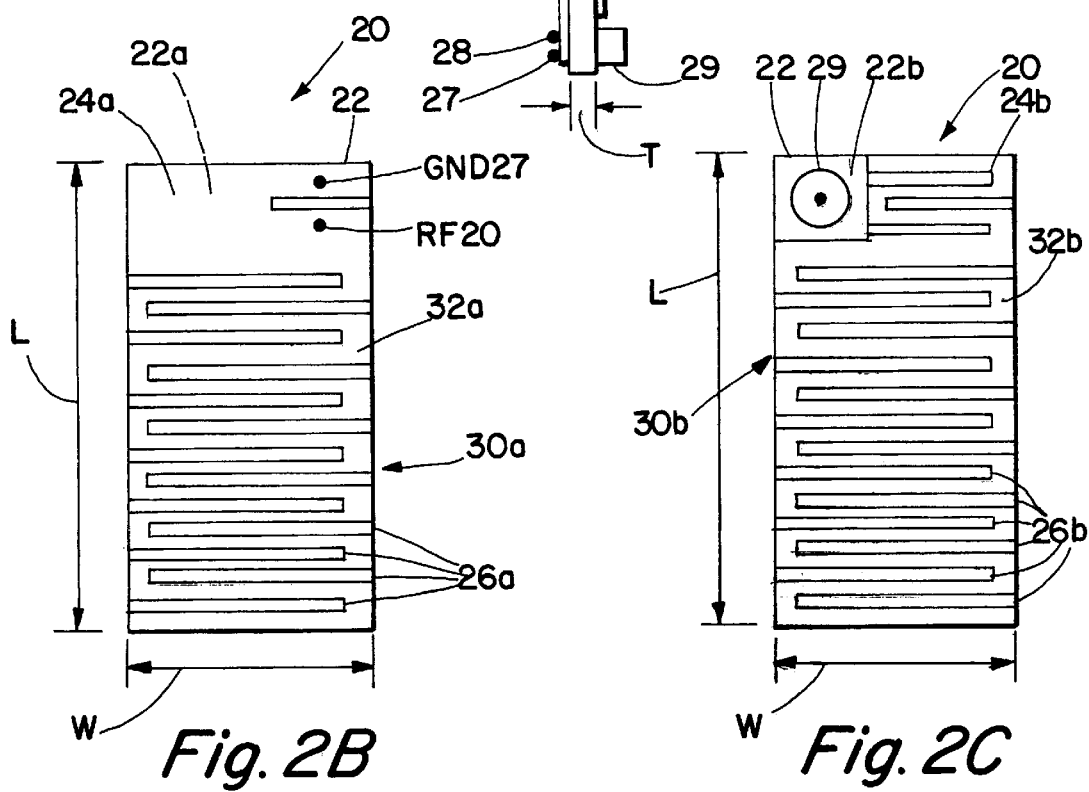

Referring now to FIGS. 2A–2C a dual band diversity antenna 20 in accordance with a preferred embodiment of the present invention is illustrated. The antenna 20 includes a dielectric substrate 22, such as a fiberglass circuit board, having first and second opposite surfaces 22a and 22b. A particularly preferable material for use as the substrate is an FR4 board which is well known to those having skill in the art of circuit boards. However, various dielectric materials may be utilized for the substrate 22. Preferably, the dielectric substrate 22 has a dielectric constant between 4.4 and 4.8 for the illustrated embodiment. However, it is to be understood that dielectric substrates having different dielectric constants may be utilized without departing from the spirit and intent of the present invention.

Diversity antennas, according to the present invention, are particularly well suited for combating both Rayleigh (line of sight and one main reflection) and Ricean (multiple reflections) fading. The present invention allows the diversity antenna to reside in a very small mobile radiotelephone and helps when the main antenna enters into a very large fade region.

Dimensions of the dielectric substrate 22 may vary depending on the space limitations of the radiotelephone or other communications device within which the diversity antenna 20 is incorporated. Typically, the dielectric substrate 22 will have a thickness T of between 1.0 and 1.5 millimeters (mm); a width W of between 11 and 22 mm; and a length L of between 21 and 23 mm.

A layer of copper or other conductive material is secured to both the first and second substrate surfaces 22a and 22b, and is indicated as 24a and 24b, respectively. A preferred conductive material is copper tape because portions thereof can be removed easily during tuning of the antenna. Typically, the thickness of the conductive layers 24a, 24b on each respective substrate surface 22a, 22b is between 0.5 ounces (oz) and 1.0 oz copper.

A ground post 27 and a hot RF feed point 28 are electrically connected to the conductive layer 24a, as illustrated in FIG. 2B. The locations of the ground post 27 and the hot RF feed point 28 on the substrate first surface conductive layer 24a are selected based upon desired input impedance. A coaxial connector 29 extends through, but is not electrically connected to, the substrate second surface conductive layer 24b, as illustrated in FIG. 2C. The ground post 27 and the hot RF feed point 28 are electrically connected to underlying circuitry (not shown) within a radiotelephone via the coaxial connector 29, as will be described below.

The conductive layer 24b secured to the substrate second surface 22b is a parasitic conductive layer; i.e., it is not electrically connected to other portions of the antenna 20. As is known to those skilled in the art, parasitic electromagnetic elements are coupled to, and "feed off", near-field currents (i.e., currents flowing on a conductive surface exist in a "field" of electromagnetic fields that the currents induce in close proximity to the conductive surface). A parasitic antenna is an antenna that is not driven directly by an RF source, but rather, is excited by energy radiated by another source. The presence of a parasitic element may change the resonant characteristics of a nearby antenna, allowing the antenna to resonate in more than one band.

As will be described below, the first and second substrate surfaces 22a, 22b and the respective conductive layers 24a, 24b thereon each function as respective radiating elements, indicated as 30a and 30b. Radiating element 30a is referred to as a "fed" radiating element, and radiating element 30b is referred to as a "parasitic" radiating element. As will be described below, the fed and parasitic radiating elements 30a, 30b allow the antenna 20 to be tuned so as to resonate within at least two frequency bands.

Referring to FIGS. 2B and 2C, portions 26a, 26b of each conductive layer 24a, 24b respectively, have been removed to create meandering electrically conductive patterns for radiating RF energy, indicated as 32a and 32b, respectively. The length of each meandering electrically conductive pattern 32a, 32b is a tuning parameter, as is known to those skilled in the art. The fed radiating element 30a and the parasitic radiating element 30b allow the antenna 20 to resonate within at least two frequency bands. The parasitic radiating element 30b is excited by magnetic fields generated from the fed radiating element 30a. The fed radiating element 30a and the parasitic radiating element 30b are preferably configured to produce two different resonant frequencies. Accordingly, the bandwidth of the antenna may be increased compared with an antenna having only a single radiating element.

Figure 3:
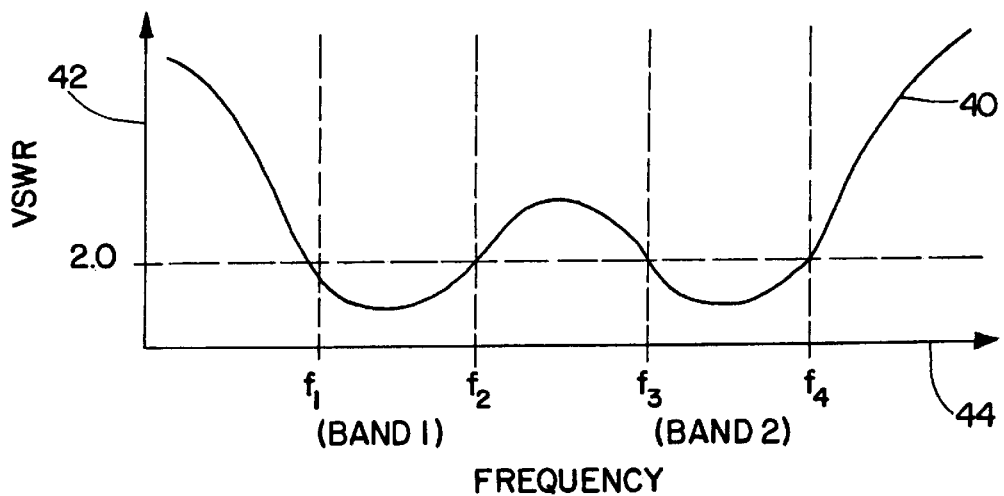
FIG. 3 is an exemplary resonance curve achievable by a dual band diversity antenna incorporating aspects of the present invention.

Referring now to FIG. 3, an exemplary resonance curve 40 achievable by a dual band diversity antenna, according to the present invention, is illustrated. VSWR is plotted along the "Y" axis and is indicated as 42. Frequency is plotted along the "X" axis and is indicated as 44. As shown by the illustrated resonance curve 40, the fed radiating element 30*a* and the parasitic radiating element 30*b* are configured to resonate at two closely spaced receive bands (Band 1) and (Band 2). Band 1 extends from frequency $f_1$ to frequency $f_2$, and Band 2 extends from frequency $f_3$ to frequency $f_4$. Band 1 and Band 2 are closely spaced and each is below the 2:1 VSWR to facilitate impedance matching. The resonance curve 40 shows where (in frequency) the match between the antenna and the receiver circuit will result in 0.5 dB or less of loss. The represented a dual band diversity antenna is made to approach a ¼—¼ wave retractable antenna in gain over the two frequency bands. As is understood by those skilled in the art, the resonance curve 40 is adjustable by "tuning" the antenna 20. Tuning includes adjusting and selecting various parameters of the dual band diversity antenna as described below.

Figure 4:
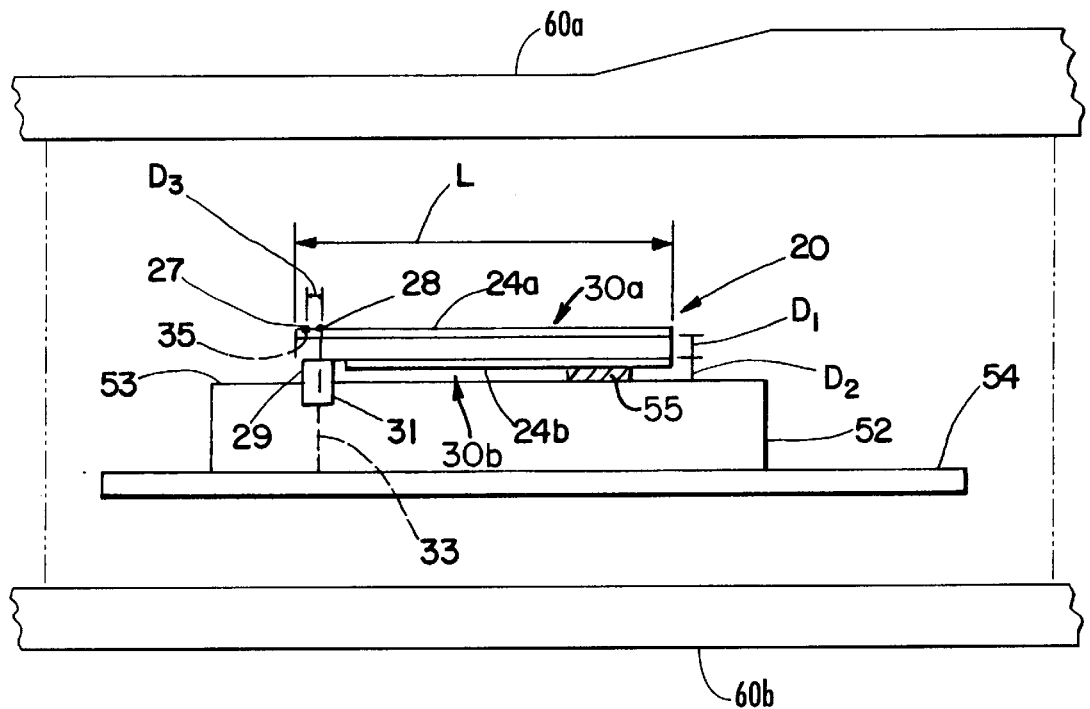
FIG. 4 illustrates a dual band diversity antenna, according to the present invention, secured to a shield can of a radiotelephone.

Referring now to FIG. 4, a dual band diversity antenna 20, according to the present invention, is illustrated in an installed configuration within upper and lower housing portions 60*a*,60*b* of a communications device, such as a radiotelephone. The housing portions 60*a*, 60*b* are configured to enclose the circuit board 54 and diversity antenna 20 as would be understood by one of skill in the art. The antenna 20 overlies, and is maintained in spaced apart relationship with, a shield can 52. The shield can 52 overlies a circuit board 54 and provides electromagnetic interference (EMI) shielding for various microelectronic components (not shown) secured to the circuit board. The shield can 52 has a planar outer surface 53 which serves as a ground plane for the antenna 20.

In the illustrated embodiment, a coaxial connector 29 provides a pathway for a hot feed element 33 to extend from the circuit board 54 through the shield can aperture 31 and electrically connect with the feed point 28. The illustrated coaxial connector 29 also provides a pathway for a ground feed element 35 to electrically connect the ground post 27 with the grounded shield can 52. As is known to those skilled in the art, the hot feed element 33 electrically connects the hot RF feed point 28 with a receiver input and output (not shown), preferably via an RF switch (receive only) (not shown), on the underlying circuit board 54. The RF switch switches out the primary and diversity antennas to the receiver.

The parasitic radiating element 30*b* of the antenna 20 is maintained in spaced apart generally parallel relationship with the outer surface 53 of the shield can 52. Foam 55 or other similar non-conductive material is preferably placed between the parasitic radiating element 30*b* and the outer surface 53 of the shield can 52 and serves as means for reducing the effects of vibrations and jarring.

Tuning parameters for the illustrated diversity antenna 20 include, but are not limited to: the length L of the antenna 20; the thickness $D_1$ of the dielectric substrate 22; the distance $D_2$ between the shield can 52 and the antenna 20; the distance $D_3$ between the hot RF feed point 28 and the ground post 27; and the length of the meandering electrically conductive patterns of both the fed radiating element 30*a* and the parasitic radiating element 30*b*. The dielectric substrate 22 and length of the meandering electrically conductive patterns define "electrical length" necessary to radiate a resonance structure. Ground plane, feeds and feed separation are variations of the classical antenna.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An antenna, comprising:

a dielectric substrate comprising opposite first and second faces;

a first radiating element disposed on said dielectric substrate first face, said first radiating element comprising a first meandering electrically conductive path having an RF feed point and a around post;

a second radiating element disposed on said dielectric substrate second face and capacitively coupled with said first radiating element, said second radiating element comprising a second meandering electrically conductive path, wherein said first and second meandering electrically conductive paths have different lengths;

a hot feed element extending through said dielectric substrate and electrically connected to said RF feed point; and a ground feed element extending through said dielectric substrate and electrically connected to said ground post, wherein the ground feed element is not in electrical contact with the second radiating element.

2. An antenna according to claim 1 wherein said dielectric substrate has a dielectric constant between 4.4 and 4.8.

3. An antenna according to claim 1 wherein said first and second radiating elements jointly resonate within adjacent frequency bands.

4. An antenna according to claim 3 wherein said adjacent frequency bands are between 0.810 and 0.828 GHz and between 0.870 and 0.885 GHz, respectively.

5. An antenna assembly for a communications device, said antenna assembly comprising:

a ground plane having an aperture therethrough;

a planar antenna in adjacent parallel spaced apart relationship with said ground plane, and wherein said antenna comprises:

a dielectric substrate comprising opposite first and second faces;

a first radiating element disposed on said substrate first face, said first radiating element comprising a first meandering electrically conductive path having an RF feed point and a ground point; and a second radiating element disposed on said substrate second face and capacitively coupled with said first radiating element, said second radiating element comprising a second meandering electrically conductive path, wherein said first and second meandering electrically conductive paths have different lengths;

a hot feed element extending through said ground plane aperture and electrically connected to said feed point through said dielectric substrate; and a ground feed element extending from said ground plane and electrically connected to said ground point through said dielectric substrate, wherein the ground feed element is not in electrical contact with the second radiating element.

6. An antenna assembly according to claim 5 wherein said dielectric substrate has a dielectric constant between 4.4 and 4.8.

7. An antenna assembly according to claim 5 wherein said first and second radiating elements jointly resonate within adjacent frequency bands.

8. An antenna assembly according to claim 7 wherein said adjacent frequency bands are between 0.810 and 0.828 GHz and between 0.870 and 0.885 GHz, respectively.

9. A radiotelephone apparatus, comprising:

a housing;

a circuit board disposed within said housing and having a face with electronic components mounted thereon;

a shield can overlying and secured to a portion of said circuit board face, said shield can having a planar outer surface with an aperture formed therethrough;

a planar antenna overlying said shield can outer surface and comprising:

a dielectric substrate comprising opposite first and second faces;

a first radiating element disposed on said substrate first face, said first radiating element comprising a first meandering electrically conductive path having an RF feed point and a ground point; and a second radiating element disposed on said substrate second face and capacitively coupled with said first radiating element, said second radiating element comprising a second meandering electrically conductive path;

wherein said planar antenna is secured within said housing such that said second radiating element is in spaced apart parallel relationship with said shield can outer surface;

a hot feed element extending from said circuit board through said shield can aperture and electrically connecting said feed point; and a ground feed element extending from said shield can and electrically connecting said ground point.

10. A radiotelephone apparatus according to claim 9 further comprising means for reducing vibrations, said means positioned between said second radiating element and said shield can outer surface.

11. A radiotelephone apparatus according to claim 9 wherein said first and second meandering electrically conductive paths have different lengths.

12. A radiotelephone apparatus according to claim 9 wherein said dielectric substrate has a dielectric constant between 4.4 and 4.8.

13. A radiotelephone apparatus according to claim 9 wherein said hot feed element extends through said dielectric substrate.

14. A radiotelephone apparatus according to claim 9 wherein said ground feed element extends through said dielectric substrate.

15. A radiotelephone apparatus according to claim 9 wherein said first and second radiating elements jointly resonate within adjacent frequency bands.

16. A radiotelephone apparatus according to claim 15 wherein said adjacent frequency bands are between 0.810 and 0.828 GHz and between 0.870 and 0.885 GHz, respectively.

* * * * *

UNITED STATES PATENT AND TRADEMARK OFFICE
CERTIFICATE OF CORRECTION

PATENT NO. : 6,040,803
DATED : March 21, 2000
INVENTOR(S) : John M. Spall

It is certified that error appears in the above-identified patent and that said Letters Patent is hereby corrected as shown below:

<u>Title page,</u>
Item [75], Inventors, please delete "Raleigh" and substitute -- Cary -- therefor.

<u>Column 6,</u>
Line 28, please delete "around" and substitute -- ground -- therefor.

Signed and Sealed this

Fifth Day of April, 2005

JON W. DUDAS
*Director of the United States Patent and Trademark Office*